Figure 1:
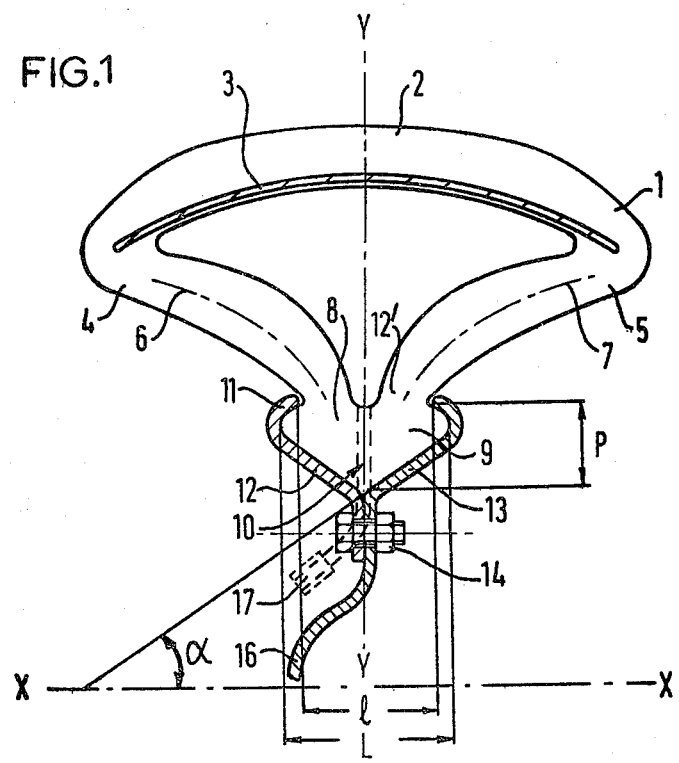

United States Patent [19]

Tangorra

[11] 3,895,668

[45] July 22, 1975

[54] PNEUMATIC WHEEL

[75] Inventor: Giorgio Tangorra, Milan, Italy

[73] Assignee: Industrie Pirelli, S.p.A., Milan, Italy

[22] Filed: Dec. 3, 1973

[21] Appl. No.: 421,059

[30] Foreign Application Priority Data
Dec. 20, 1972 Italy.................................. 33204/72
Sept. 26, 1973 Netherlands........................... 13262
Oct. 1, 1973 Yugoslavia........................... 2574/73

[52] U.S. Cl.............. 152/379; 152/353 C; 152/380; 152/398; 152/404
[51] Int. Cl...... B60c 15/02; B60c 17/00; B60c 5/00
[58] Field of Search ........... 152/375, 379, 380, 381, 152/382, 398, 399, 400, 404, 405, 353 C, 397

[56] References Cited
UNITED STATES PATENTS

| | | | |
|---|---|---|---|
| 736,414 | 8/1903 | Litchfield............................ | 152/404 |
| 767,606 | 8/1904 | Stein.................................... | 152/398 |
| 893,075 | 7/1908 | Hopkinson........................... | 152/375 |
| 994,247 | 6/1911 | Cole..................................... | 152/398 |
| 1,022,127 | 4/1912 | Dettelbach.......................... | 152/398 |
| 1,333,679 | 3/1920 | Rey...................................... | 152/398 |
| 1,590,288 | 6/1926 | Deister................................ | 152/405 |
| 1,739,370 | 12/1929 | Moulton .............................. | 152/405 |
| 1,862,269 | 6/1932 | Johnson ........................... | 152/353 C |
| 2,187,777 | 1/1940 | Gannett ............................... | 152/379 |
| 3,805,868 | 4/1974 | Tangorra......................... | 152/353 C |

Primary Examiner—Drayton E. Hoffman
Attorney, Agent, or Firm—Stevens, Davis, Miller & Mosher

[57] ABSTRACT

A pneumatic wheel is disclosed made of a pneumatic tire and a rim wherein the tire sidewalls have a meridian plane convexity in their section midline which is directed toward the tire inside and so formed to be bent and compressed by inflation air. The tire also has a rim connection zone which is radially inner with respect to the sidewalls. The rim is single seated for connection zone encasement and has a circumferential channel shape with a radially outer directed opening with respect to the axis of rotation of the wheel. The width opening is smaller than the maximum channel width and the connection zone and channel have similar profiles with the cross section of the zone being no smaller than the cross section of the channel.

14 Claims, 2 Drawing Figures

PATENTED JUL 22 1975 3,895,668

PNEUMATIC WHEEL

The present invention relates to pneumatic wheels for vehicles, and more precisely it concerns the anchorage between the pneumatic tire and the corresponding assembling rim.

Pneumatic tires, more briefly called "tires," generally comprise a tread and two sidewalls, each of which terminates at a zone called the "bead" which is that part of the tire designed to be connected to the rim and constituting a single unit called a "pneumatic wheel."

Generally, in conventional tires, the sidewalls are prevailingly subjected to tension stresses owing to the effect of the inner pressure; in said case, the most common way to carry out the fitting between the tire and the rim is to force the base of the circumferentially inextensible beads against two conical surfaces at the sides of the rim.

Copending Ser. No. 273,337, filed July 19, 1972 now U.S. Pat. No. 3,805,868 illustrates, however, a tire wherein as a result of the inner pressure, the sidewalls are prevailingly subjected to compression and bending stresses, since each sidewall is pushed in an axial direction towards the outside and at the same time, is blocked against two fixed points respectively constituted by the edge of a substantially inextensible annular structure, arranged in a radially inner position with respect to the tread, and by the circumferentially incompressible rim.

Owing to the prevailing compression and bending stress, the sidewalls and the beads of said tires can also be formed of homogeneous material, for instance an elastomeric material devoid of any continuous reinforcing structure, and can be obtained by means of a simple pouring or molding process.

In the tires according to the mentioned application, (as, on the other hand, in any tire), it is desirable to maintain a certain anchorage between the beads and the rim especially when the inner pressure is lacking. This is desired in order to avoid, both as a result of an excessive lateral deformation of the tire on cornering and of a possible deflation of the tire, separation which may take place between the tire and the rim.

The present invention aims at providing a particular anchorage between the pneumatic tire and the relative rim, which has a simple arrangement and is therefore economical.

Accordingly, the object of the present invention is a pneumatic wheel for motor vehicles, which comprises a pneumatic tire with a tread, two sidewalls having their own section midline, in the meridian plane, with a convexity directed towards the inside of said tire, said sidewalls being such that due to the inflation air, they are subjected to compression and to bending, and a rim connection zone, which is radially inner with respect to said sidewalls, characterized in that said rim has a single seat for encasing said connection zone, said seat having the shape of a circumferential channel with an opening directed in a radially outer direction with respect to the axis of rotation of the pneumatic wheel, the width of said opening being smaller than the maximum width of said channel, said connection zone having in cross section a profile of a form equal to that of the profile of said channel, the profile of said connection zone being enclosed by the profile of said channel, and the cross section of said connection zone being no smaller than the cross section of said channel.

An advantage of the present invention is caused by the simplicity of the rim for it does not require the manufacture of particular separate pieces, e.g., a bead spacer to prevent the beads from detaching from the tire in the event of deflation. The rim is of extremely economical construction.

Moreover, it has been surprisingly ascertained that the tire according to the present invention offers an improved degree of comfort, together with a greater transversal rigidity when compared to the analogous type of tire in which each bead is inserted in its own seat.

Probably this is due to the fact that, at an equal width of the tread, the inclination of the sidewalls is considerably more marked than in a tire in which each bead is inserted in its own seat.

In this condition, the sidewalls subjected to compression by the inflation air react in such a way as to offer less resistance to radially directed forces, while they are able to offer a greater resistance to forces directed in the transversal direction of the tire.

According to a preferred embodiment, said connection zone is constituted by two beads, the axially innermost surfaces of which are at least partially in mutual contact, said contact surfaces lying preferably on the equatorial plane of the pneumatic wheel.

Preferably, the section profiles of said two beads are symmetrical to each other, and the contact surfaces are air tight.

According to a preferred alternative embodiment, the ratio between the cross section of the two joined beads and the cross section of said channel ranges between 1 and 1.4.

According to a further preferred embodiment, the ratio between the width of the opening and the maximum section width of said channel ranges between 0.3 and 0.9, the section profile of said channel preferably comprising two walls which converge towards the radially innermost zone, the line joining each axially outermost point of said profile with the radially innermost point forming an angle ranging between 30° and 70° with respect to the axis of rotation of the rim.

Preferably, each joining line is symmetrically inclined with respect to the median axis of the rim.

According to a further alternative embodiment, said channel is circumferentially divided into two parts, the first constituting the flange for connection to the hub, and the second being connected to the first by means of bolts.

Figure 2:
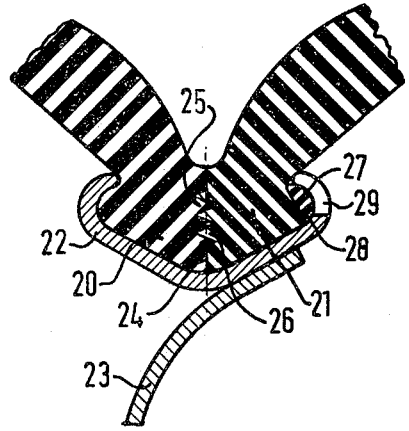

The invention will now be better illustrated with reference to the attached drawings, given by way of example, in which:

FIG. 1 represents the cross section of a pneumatic wheel according to the present invention, and FIG. 2 represents in cross section an alternative embodiment of the present invention.

FIG. 1 illustrates the cross section of a tire 1 of the type described in Ser. No. 273,337 having a tread 2 comprising a reinforcing structure 3 and two sidewalls 4 and 5 whose section midlines 6 and 7 have their convexity directed towards the inside of the tire.

The tire has two beads 8 and 9, whose axially innermost surfaces are in mutual air tight contact along line 10, lying on the median axis YY.

The beads 8 and 9 are contained in the rim 11, which has a seat in the form of a circumferential channel, with an opening 12 directed in opposite direction with respect to the axis of rotation XX of the rim.

The width $l$ of said opening is smaller than the maximum width L of the seat; for a rim suitable for car tires said width $l$ can be of the order of 36 mm, while the width L is of 46 mm; for said dimensions the depth $p$ of the seat is of 25 mm, the ratio $l/L$ being 0.78 and the ratio $p/L$ being 0.55.

The section profile of the seat of the rim 11 is approximately in the form of an isosceles triangle, with the two sides 12 and 13 equal to each other, the vertex comprised between said sides being directed towards the axis of rotation XX; each side 12 and 13 is inclined at an angle $\alpha$ of about 50° with respect to said axis of rotation.

However, said section profile can take other geometrical shapes, as for instance a circular, ovoidal, elliptical configuration or the like.

The section profile of the beads 8 and 9 joined together has a shape similar to that of the seat of the rim 11; however, the section of said beads is greater than the section of the rim seat; in the case of FIG. 1 the maximum axial width of the section of each bead is 25 mm, while the analogous width of the section of the seat of the rim 11 is 46 mm, the ratio between the two cross sections being about 0.55.

The rim 11 is split in two parts, one of which extends radially inwardly to constitute the flange 16 for connection to the wheel hub (not illustrated); said parts can be assembled together by means of a plurality of bolts 14 uniformly distributed along the circumferential development of the rim.

Alternatively, the connection between the two parts of the rim 11 can be obtained by means of a circumferential welding.

The tire 1, fitted to the rim 11, can be inflated to the required service pressure by means of a valve 17 situated between two adjacent bolts 14 or passing through the rim 11 and the beads 8 and 9; as the sidewalls of said tire work prevailingly under compression, the inflation can also be effected through a sidewall, either by means of a valve or of a syringe.

FIG. 2 represents an alternative embodiment of the present invention, in which the two beads 20 and 21 of a pneumatic tire of the type illustrated in FIG. 1 are inserted in a rim 22 having the same channel-shaped profile described above, but constituted by a single structural shape instead of being made of two parts, the structural shape being connected to the wheel hub (not illustrated) by means of the disc 23 welded to said structural shape.

In order to improve the anchorage between the contact surfaces 24 of the two beads, said surfaces are provided with grooves and projections 25 and 26, having a circumferential path, which fit mutually.

The bead 21 has a circumferential cavity 27 intended to receive an additional forcing element 28, having an approximately semi-circular section, of a value greater than that of said cavity in order to carry out the desired forcement of the beads 20 and 21 in the rim 22.

Said additional element, introduced in said cavity, presses the bead 21 both in radial direction and in axial direction, providing in this way the blocking of both beads in the suitable seat of the rim.

In the example of FIG. 2, said additional element is constituted by a rubber ring having a compression modulus of the same order as that of the rubber constituting the beads, and circumferentially extensible to overcome the outermost diameter of the rim 22; however, said rubber ring can be replaced by a plurality of sectors, made of metal or of nylon, circumferentially aligned to one another and having the same section as said rubber ring.

Although not illustrated in FIG. 2, in order to improve the anchorage of the beads to the rim, it is possible to provide two additional elements of the above described type, one for each bead.

The rim 22 is provided with a radial slit 29 (or with a plurality of slits uniformly distributed along the circumference of the rim), having a width suitable for permitting the introduction of a hook capable of removing the rubber ring 28 (or each sector-shaped element) for disassembling the tire from the rim.

It is understood that the above reported examples do not have a limiting character and that the scope of protection of the present invention includes any other alternative embodiment deriving from the above indicated inventive principle.

What is claimed is:

1. A pneumatic wheel for motor vehicles comprising a pneumatic tire with a tread, an annular reinforcing structure, two sidewalls having a convexity in the meridian plane of their section midline directed toward the inside of the tire and so constructed that as a result of the inflation air they are subjected to compression and to bending and a rim connection zone being radially inner with respect to said sidewalls, said rim having a single seat for encasing said connection zone, said seat having the shape of a circumferential channel with an opening directed in a radially outer direction with respect to the axis of rotation of the pneumatic wheel, the width of said opening being smaller than the maximum width of said channel, said connection zone having a cross-sectional profile of a form equal to that of the profile of said channel, the profile of said connection zone being enclosed by the profile of said channel, and the cross section of said connection zone being no smaller than the cross section of said channel; the cross section of said tire having a shape approximately that of an isosceles triangle whose base is represented by the chord subtending the annular reinforcing structure, the sides being represented by the chords subtending the respective section midlines of the sidewalls which are wholly internal to the sides of said triangle, the vertex comprised between said sides lying on the tire midline in said connection zone between the tire and the rim.

2. The pneumatic wheel of claim 1 wherein said connection zone is constituted by two beads, whose axially innermost surfaces are at least in partial mutual contact.

3. The pneumatic wheel of claim 2 wherein the surface of contact lies on the equatorial plane of the pneumatic wheel.

4. The pneumatic wheel of claim 2 wherein the contact between the surfaces is airtight.

5. The pneumatic wheel of claim 2 wherein said beads have symmetrical section profiles.

6. The pneumatic wheel of claim 2 wherein the ratio between the cross section of the two joined beads and the channel cross section is from 1 to 1.4.

7. The pneumatic wheel of claim 1 wherein the ratio between the width of the opening and the maximum section width of said channel is from 0.3 to 0.9.

8. The pneumatic wheel of claim 7 wherein the channel section profile comprises two walls converging toward the radially innermost zone and further wherein the lines joining each axially outermost point of said profile with the radially innermost point form an angle of from 30° to 70° with respect to the rim axis of rotation.

9. The pneumatic tire of claim 8 wherein each wall is symmetrically inclined with respect to the median axis of the rim.

10. The pneumatic tire of claim 1 wherein said channel is circumferentially divided into two parts, the first constituting the flange for connection to the hub and the second being boltedly connected to the first.

11. A pneumatic tire for vehicles comprising a tread, sidewalls extending radially inwardly from the tread and convex with respect to the interior of the tire when under inflation pressures, and beads around the innermost edges of the sidewalls which are adapted to cooperate with a rim of corresponding cross-sectional shape to removably secure the tire to a vehicle wheel, said beads having surfaces integral with the inner surfaces of the sidewalls adapted to be pressed together when held by the rim to form a substantially fluid impervious seal therebetween and to join with the tread and sidewalls to enclose a cavity for fluid under pressure when the tire is inflated, said beads having annular external ribs adjacent to the points where they meet the sidewalls which are adapted to be gripped by a rim and external surfaces which converge from the ribs to the point where said inner surfaces of the beads abut when they are pressed together.

12. The pneumatic tire of claim 11 wherein said converging surfaces of the beads impart a cross-sectional shape to the beads when pressed together which approximates the shape of an isosceles triangle.

13. The pneumatic tire of claim 11 in combination with a rim having an interior shape corresponding to the external shape of the beads when pressed together to form a substantially fluid impervious seal.

14. The pneumatic tire of claim 11 wherein the general cross-sectional shape thereof when installed on a rim resembles an isosceles triangle with the vertex at the external point where the inner surfaces of beads abut when pressed together and with the base extending through the thickness of the tread portion of the tire.

* * * * *